J. W. LATSHAW.
APPARATUS FOR DRESSING SKELP.
APPLICATION FILED APR. 10, 1919.

1,349,070.

Patented Aug. 10, 1920.
3 SHEETS—SHEET 1.

WITNESS
R. F. Dilworth
R. D. Little

INVENTOR.
J. W. Latshaw
by D. Anthony Usina
Attorney

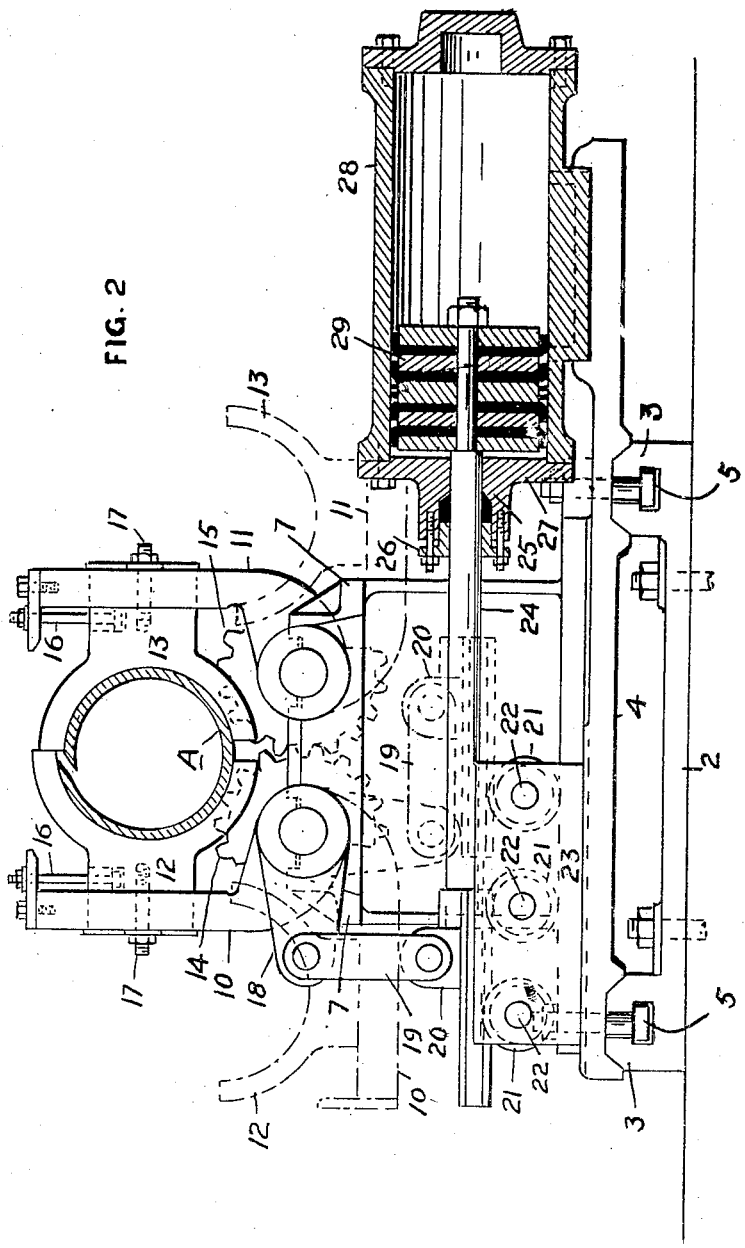

J. W. LATSHAW.
APPARATUS FOR DRESSING SKELP.
APPLICATION FILED APR. 10, 1919.
1,349,070.
Patented Aug. 10, 1920.
3 SHEETS—SHEET 3.
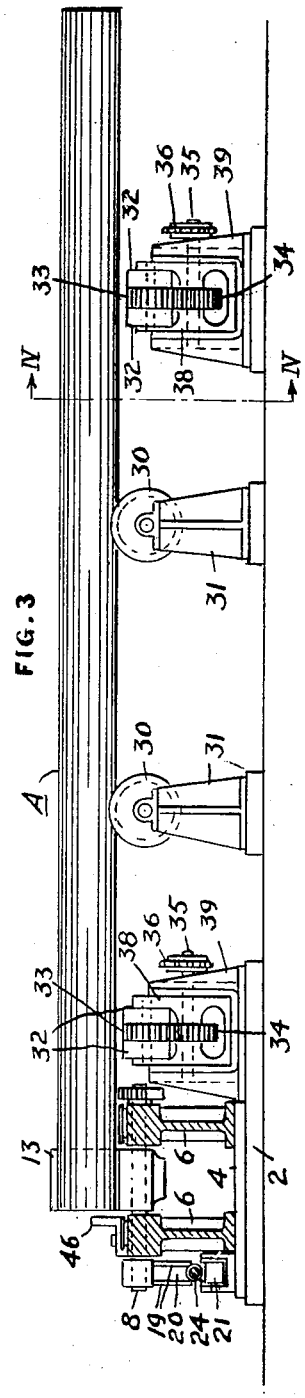
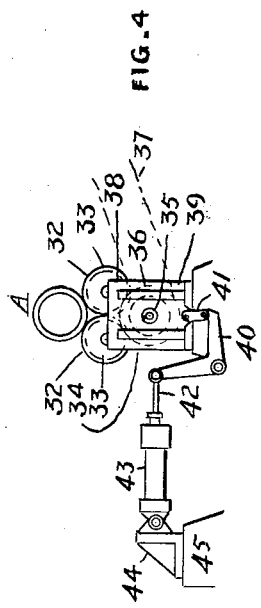
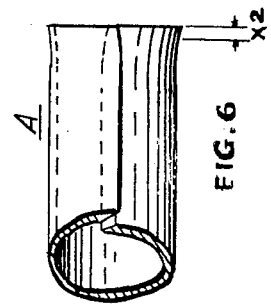
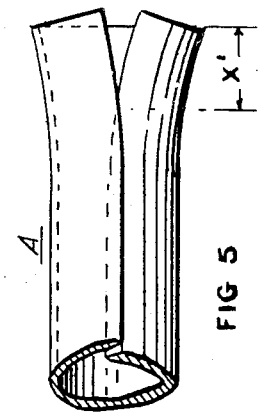
INVENTOR.
J. W. LATSHAW

UNITED STATES PATENT OFFICE.

JOSEPH W. LATSHAW, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

APPARATUS FOR DRESSING SKELP.

1,349,070.      Specification of Letters Patent.      Patented Aug. 10, 1920.

Application filed April 10, 1919. Serial No. 289,165.

*To all whom it may concern:*

Be it known that I, JOSEPH W. LATSHAW, a citizen of the United States, and resident of Pittsburgh, in the county of Allegheny and State of Pennsylvania, have invented certain new and useful Improvements in Apparatus for Dressing Skelp, of which the following is a specification.

My invention relates to the manufacture of lapweld pipes and tubes and more particularly to dressing the ends of the pipe skelp after the flat plates are bent to cylindrical form by a preliminary skelp bending operation, and preparatory to the subsequent welding operation, by which the scarfed, overlapping edges of the bent and dressed skelp are welded and thereby formed into a pipe or tube.

In making lapweld pipes and tubes, thin, flat plates, known as skelp, and having the longitudinal edges thereof scarfed, after being heated, are bent transversely into substantially cylindrical form, with the scarfed edges of the skelp in overlapped relation, generally by pulling the heated skelp through a bending die. The bent skelp are then re-heated until the overlapping edges are at a welding temperature and the bent highly heated skelp are then passed between the welding rolls and a welding ball which forms an internal support for the pipe being welded, and the scarfed edges of the pipes or tubes thereby welded.

In bending the flat skelp in preparation for the welding operation, the scarfed edges are brought into overlapped position for the major portion of the length thereof without much difficulty. But a portion of its length at each end of the skelp does not have the edges in the desired overlapping relation, and it is extremely desirable, if not necessary, that the edge of the bent skelp at the ends of the skelp, particularly the "first end" *i. e.*—that end which first enters between the welding rolls, should be in overlapping relation.

Heretofore it has been the practice to secure this desired close juxtaposition of the edges of the plates at the ends thereof by means of a manually operated sledge, the "first end" or both ends of the skelp being bent by striking it or them a series of blows with the sledge, immediately after the bending operation, while the plate still remains hot. This crude method is slow, laborious and expensive. It also is so inaccurate that a considerable amount of the length of the welded pipes or tubes is defective and must be cut off later in order to insure a plain end on such of the pipes as remain unthreaded and a good end on those that are later threaded.

One object of my invention is to provide novel means for dressing the ends of the bent pipe skelp after the preliminary bending operation, in such manner as will greatly increase the length of perfect pipes or tubes obtained in a given length of skelp and will materially lessen the amount of material necessary to "crop" or cut off the ends of the welded pipes and tubes.

Another object of my invention is the provision of improved means whereby the end dressing operations are mechanically performed in a rapid and accurate manner immediately after the skelp bending operations, and while the bent skelp is still hot from the skelp bending operation.

A still further object of my invention is the provision of apparatus for dressing the ends of bent skelp having the novel constructions, arrangements, and combination of parts shown in the drawings, to be fully described in detail hereinafter, and to be particularly pointed out in the appended claims.

Referring now to the drawings, forming part of this specification, Figure 1 is a plan showing skelp dressing apparatus embodying my invention.

Fig. 2 is an end elevation, partly in section, of the apparatus shown in Fig. 1 (the gap or space between the overlapped edges of the skelp being shown somewhat exaggerated for the sake of clearness).

Fig. 3 is a side elevation, partly in section, showing a preferred arrangement of apparatus for handling bent skelp, as applied for use in conjunction with the skelp dressing apparatus of Figs. 1 and 2.

Fig. 4 is a diagrammatic end elevation, on the line IV—IV of Fig. 3, showing the turning rollers by which the bent skelp are turned axially to bring the overlapping edges thereof into position to be engaged by the bending dies of the end dressing apparatus.

Fig. 5 is a detail plan showing a portion of a bent skelp with the end thereof as formed in the skelp bending operation, and prior to the skelp dressing operation.

Fig. 6 is a detail plan similar to Fig. 5, showing the end of the bent skelp after the skelp dressing operation, and prior to heating and welding.

Figure 1:
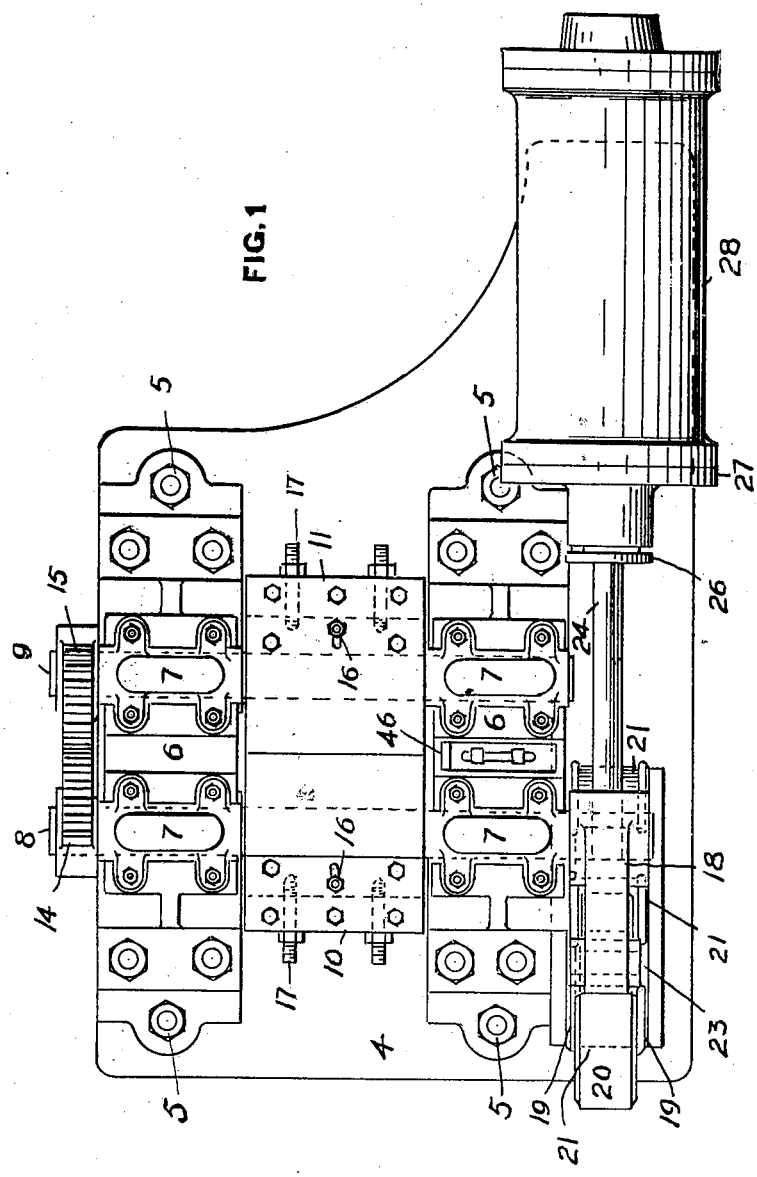

In the accompanying drawings, the numeral 2 designates a base-plate which is fixed in position on a suitable foundation and has parallel shears or ways 3, 3 on which the platen 4 is adjustably held by means of the bolts 5. The platen 4 has bearing stands 6 at its sides, on the upper end of which are pairs of bearings 7, 7, and rotatably mounted in the bearings are horizontal rock shafts 8 and 9. The axes of the shafts 8 and 9 are in the same horizontal plane, and keyed or otherwise fastened on the shafts, so as to rock therewith, are rocking arms 10 and 11. Adjustably fastened on one side of the arms 10 and 11 at the swinging end thereof, are skelp dressing dies 12 and 13, these dies having co-acting cavities, which, when the dies are in closed position, preferably are spiral in outline as shown in Fig. 2. In some cases however, the cavity formed by the closed die cavities may be arranged to form a true circle, instead of a spiral, as shown.

The shafts 8 and 9 also are provided (on one end thereof as shown,) with segmental spur gears 14 and 15, with the teeth of the gears in mesh, the gears acting to swing the rocking arms 10 and 11 in unison. The dressing dies 12 and 13 are adjustably secured on the swinging ends of the arms 10 and 11, being adjusted and held in adjusted position by means of the pairs of bolts 16 and 17. (See Figs. 1 and 2).

The shaft 8 has an overhanging end on which a rocking arm 18 is keyed or otherwise fastened, and the outer or swinging end of this rocking arm is connected by links 19 to one end of a reciprocatory crosshead 20. The crosshead 20 is arranged to move horizontally, being supported upon the flanged anti-friction rollers 21 which are rotatably mounted on pins 22 in the roller stands 23 which are secured on top of the platen 4.

The crosshead 20 is fastened to the outer end of a piston rod 24 which extends through a stuffing box 25 and gland 26 on the head 27 on one end of the double acting fluid pressure cylinder 28. A piston 29 within the cylinder is secured on the other end of the piston rod 24 to actuate the apparatus in moving the shaping dies 12, 13 from closed position, (shown by full lines in Fig. 2) into open position, (that shown by broken lines) and vice versa.

The rocking arm 18 is secured on the shaft 8 so as to extend lengthwise horizontally, or in a plane substantially parallel to the plane of movement of the crosshead 20 when the dies 12 and 13 are in closed position. This arrangement of the rocking arm causes the swinging arms 10 and 11 and shaping dies 12 and 13 to move rapidly at the beginning of the closing movement thereof and gradually decrease in speed until the dies are moving very slowly, with a corresponding increase in power at the end of the closing movement thereof in the skelp dressing operations.

The cylinder 28 has ports at its end connected by means of suitable piping to a four-way valve, (not shown), by which operation of the dressing apparatus by the cylinder is controlled.

An adjustable stop 46 (see Figs. 1 and 3) on one end of the dressing apparatus limits the movement of the skelp lengthwise and positions it with reference to the dressing dies.

Located at one side of and in line with the dies 12, 13, is a plurality of grooved skelp supporting rollers 30, these rollers being rotatably mounted on stands 31, and being arranged to support the bent skelp while they are being moved lengthwise into and out of position relative to the dies and while the ends of the skelp are being subjected to the dressing operations. (See Fig. 3).

Also positioned in line with the dressing dies 12 and 13 and the supporting rollers 30, are rollers 32 by which the bent skelp are turned axially to bring the overlapping longitudinal edges thereof uppermost or in position for engagement by the end dressing dies. The rollers 32 are arranged in pairs with their axes parallel with the axis of the bent skelp and at right angles to the axis of the rollers 30, and each roller 32 is provided with spur gear teeth 33 which mesh with the spur gear 34 below each pair of rollers. (See Figs. 3 and 4). The shaft 35 for the upper gear 34 has a sprocket wheel 36 on one end, and a sprocket chain 37 connects the sprocket wheel with a driving sprocket (not shown,) to positively drive the rollers 32 which then are brought into lifted engagement with the bent skelp to cause the skelp to turn axially. The rollers 32 may be driven either continuously or intermittently as desired.

The rollers 32 are mounted in pairs on frames 38 which are arranged to lift vertically on the frame supports 39 and thereby transfer the bent skelp from the rollers 30 to the pairs of rollers 32 when turning the bent skelp axially. A roller lifting mechanism comprising a bell-crank 40 having one end connected by links 41 to the lifting roller frames 38 are employed for lifting and lowering the rollers 32. The other arm of the bell-crank 40 is pivotally connected to the outer end of a piston rod 42 which is provided on its other end with a piston which is located within an oscillating cylinder 43, the cylinder 43 being pivotally connected at one end to a bracket or support 44 which is mounted on a suitable foundation 45. (See Fig. 4).

In the operation of my improved apparatus the skelp A are bent into cylindrical form with the longitudinal edges in overlapping relation in the usual and well-known manner. The bent skelp are then transferred in succession to the supporting table formed by the rollers 30, 30, and before cooling after the bending operation, are moved into position on the rollers 30, 30 to be engaged by the bending dies 12 and 13. In bringing the bent skelp into position for the end dressing operation, they are moved endwise into engagement with the end stop 46, and when necessary the piston rod 42 in the cylinder 43 is actuated to lift the pairs of rollers 32 into supporting engagement with the bent skelp. Rotation of the rollers 32 then causes the skelp to be turned axially to move the overlapping edges thereof into operative position relative to the bending dies 12 and 13. The dressing surfaces of the bending dies, when the dies are in closed position, are spiral in cross-section, so that when the distorted ends of the bent skelp are operatively engaged by the dies, such ends are trued up and made substantially cylindrical with the edges in overlapping engagement, as shown in Figs. 2 and 6.

When the bent skelp A has been moved to bring the end thereof into engagement with the stop 46 and the overlapping edges of the skelp are positioned in the desired relation to the open dies, fluid pressure is admitted to the cylinder 28 which causes the piston 29 to move the crosshead 20, and the movement of the crosshead moves the lever 18 and rocks the shaft 8. The shaft 9 being geared to the shaft 8, these shafts will rock in unison and the dies 12 and 13 will move into closed position (as shown in full lines in Fig. 2).

At the commencement of the swinging movement of the arms 10 and 11, the dies 12, 13, will swing rapidly from their open or inoperative position toward the closed or operative position. As the lever 18 approaches a horizontal position the movement of the dies 12 and 13 becomes slower with a corresponding increase in power so that at the latter end of the operative movement of the dies they operate with great force on the end of the skelp being dressed.

The closing movement of the dies dresses the end of the bent skelp which approximates the shape shown in Fig. 5 and forms this end into approximately the shape illustrated in Fig. 6. This dressing operation, as will be seen in comparing Figs. 5 and 6, results in the gap X' of Fig. 5 being eliminated or reduced in length to the negligible amount indicated by $X^2$ in Fig. 6.

Fluid pressure is then admitted to the cylinder 28 on the opposite side of the piston 29 which causes the piston to move from the position in Fig. 2 to the opposite end of the cylinder. This movement of the cylinder moves the crosshead 20 from left to right and moves the dies 12 and 13 from operative position (shown in full lines in Fig. 2,) into inoperative position (shown in broken lines in Fig. 2).

When necessary, the other end of the bent skelp will be dressed in the manner which has been described, and the skelp is then ready to be re-heated for the welding operation.

The above described operations are then repeated on the successively bent skelp, preferably immediately after the bending operation while the skelp are still highly heated from the bending operation.

The advantages of my invention will be apparent to those skilled in the art. By the use of my improved apparatus to dress the ends of the pipe skelp after the bending operation and preliminary to the welding operation a greater percentage of the length of the skelp is formed without waste, and as a result the amount of metal necessary to cut off the ends of the welded pipes is greatly reduced, and the scrap loss in the manufacture of lapweld pipe is materially lessened.

Many modifications may be made in the form and arrangement of the apparatus without departing from the invention as defined in the appended claims.

I claim:—

1. Apparatus for dressing the ends of bent pipe skelp comprising oppositely facing dies having opposite end dressing cavities, means for causing a relative approach of said dies, supporting means on which the bent skelp are moved lengthwise into and out of position to be operatively engaged by said dies, a stop for locating the ends of the bent skelp relative to said dies preparatory to the end dressing operations, rotary supporting means for turning the pipes axially to position the longitudinal edges relative to said dies, and means for actuating said rotary supporting means.

2. Apparatus for dressing the ends of bent pipe skelp comprising dies having opposed skelp end dressing cavities therein, said dies having cavities of spiral outline when in a closed position, means for moving the swinging dies into and out of closed position, supporting means on which the bent skelp are moved lengthwise into and out of position relative to said dies, a stop for locating the ends of the skelp relative to said dies preparatory to the skelp end dressing operations, and lifting means on which the skelp are turned axially to position the scarfed edges thereof relative to the dressing dies.

3. Apparatus for dressing the ends of bent pipe skelp comprising oppositely facing swinging dies having opposed skelp end dressing cavities therein, said dies having cavities of spiral outline when in a closed position, means for moving the swinging dies into and out of closed position, supporting means on which the bent skelp are moved lengthwise into and out of position relative to said dies, a stop for locating the ends of the skelp relative to said dies preparatory to the skelp dressing operations, lifting supports on which the skelp are turned axially to position the scarfed edges thereof relative to the dressing dies, and means for actuating said lifting supports.

In testimony whereof I have hereunto set my hand.

JOSEPH W. LATSHAW.